United States Patent [19]

Sirota et al.

[11] 3,939,108

[45] Feb. 17, 1976

[54] COLD WATER RESISTANT STARCH-BASED ADHESIVE CONTAINING STYRENE-MALEIC ANHYDRIDE RESIN AND FIXED ALKALI

[75] Inventors: Julius Sirota, South Plainfield; Matthew P. McKenna, Jr., Flemington, both of N.J.

[73] Assignee: National Starch and Chemical Corporation, Bridgewater, N.J.

[22] Filed: Dec. 16, 1974

[21] Appl. No.: 532,930

[52] U.S. Cl. .......................... 260/17.4 ST; 428/441
[51] Int. Cl.² ......................................... C08L 3/00
[58] Field of Search ................ 260/17.4 ST; 40/310

[56] References Cited
UNITED STATES PATENTS

| | | | |
|---|---|---|---|
| 2,624,715 | 1/1953 | Wildish | 260/17.4 |
| 2,654,170 | 10/1953 | Nestor | 40/310 |
| 2,654,171 | 10/1953 | Nestor | 40/310 |
| 2,667,462 | 1/1954 | Wildish et al. | 260/17.4 |
| 3,857,803 | 12/1974 | Shenfeld et al. | 260/17.4 ST |

*Primary Examiner*—Donald E. Czaja
*Assistant Examiner*—Edward Woodberry
*Attorney, Agent, or Firm*—Thomas B. Graham

[57] ABSTRACT

A cold water resistant adhesive composition is disclosed which exhibits an optimum balance of cold water resistance and removability when employed for labeling of bottles which will be used under conditions of extreme humidity. The adhesive comprises a mixture of starch, styrene-maleic anhydride resin, peptizer, water and sufficient alkali to obtain a pH of 8.0 to 11.0 with at least 20% of the alkali present in the form of a "fixed alkali".

8 Claims, No Drawings

COLD WATER RESISTANT STARCH-BASED ADHESIVE CONTAINING STYRENE-MALEIC ANHYDRIDE RESIN AND FIXED ALKALI

BACKGROUND OF THE INVENTION

I. Field of the Invention:

A novel ice-proof or cold water resistant adhesive for labeling bottles is provided which comprises a mixture of starch, sytrene-maleic anhydride resin, peptizer, water and sufficient alkali to obtain a pH of 8 to 11 with at least 20% of the alkali present in the form of a "fixed alkali". The adhesives thus produced provide an optimum balance of cold water resistance and label removability.

II. Brief Description of the Prior Art:

Ice-proof or cold water resistant labeling adhesives have been used for many years for conditions where extreme humidity resistance and label removal are required, as for example in labeling beer and soda bottles, and some pharmaceuticals. Heretofore, most of these adhesives were based on casein in combination with metallic salts; however, the problems associated with caseins, e.g. cost, availability, variations in quality, etc., instigated searches for casein substitutes, especially those based on low cost, readily available starches. Until recently, these searches were unsuccessful. An adhesive recently developed based on starch and ammonium salts of styrene-maleic anhydride resins exhibits superior ice-proof properties, however, it has now been found that the bond formed by these adhesives is so strong that removal of the label, even upon soaking in hot alkaline water, is difficult or impossible under such conditions and equipment as are used in commercial operations.

Due to the recent ecological pressure which has reversed the trend toward "non-returnable" bottles and reemphasized the need for "returnables" which require removal of the labels prior to reutilization, the inability to remove the labels has made these recently developed adhesives unacceptable for commercial operations.

There is thus a need in the art for an ice-proof adhesive for labels which possesses the optimum balance in properties of being sufficiently cold water resistant to remain on the bottles during use yet may be easily removed or stripped from the bottles to facilitate reutilization.

SUMMARY OF THE INVENTION

It has now been found that ice-proof adhesives which possess an optimum balance of water resistance and label removability may be prepared from a starch/styrene-maleic anhydride based composition which contains a specified amount of its required alkali in the form of a fixed alkali. Thus, ice-proof adhesives for labels may be prepared from starch, sytrene-maleic anhydride resins, peptizers, water and sufficient alkali to obtain a pH of 8.0 to 11.0 with at least about 20% of the total alkali on a stoichiometric basis employed in the form of a fixed alkali.

By the term fixed alkali, as used herein, is meant an alkaline base such as the hydroxides of sodium, potassium, lithium and the mono-, di- or tri-ethanolamines or isopropanolamines, etc. wherein the corresponding sytrene-maleic anhydride salt does not revert to an insoluble form on aging due to the volatility of the base.

Since the films of styrene-maleic anhydride salts containing at least 20% fixed alkali, within a pH range of 8.0 to 11.0, remain cold water soluble upon aging, in contrast to the films of the corresponding ammonium salts which become insoluble, it would be expected that these films would not impart the desired ice-proofness. It is therefore, completely unexpected to find that labeling adhesives compounded from these same films would possess superior ice-proofness which renders them resistant to cold water for up to 72 hours, even after extended aging. Thus, the use of these salts to produce cold water resistant or ice-proof adhesives would appear to be totally unexpected, particularly in view of the fact that both the starch film and the fixed alkali-styrene-maleic anhydride salt film are completely soluble in cold water when considered separately. While we do not wish to be bound by theory, it is hypothesized that a reaction occurs between the fixed alkali-styrene-maleic anhydride salt and the starch which results in the production of a material having superior adhesive properties even under high humidity conditions, yet which allows removal of the adhered label when desired. This behavior is completely opposed to that of the corresponding ammonium salts wherein the continual loss of volatile ammonia from the soluble ammonium-styrene-maleic anhydride film converts the film back to the insoluble acid form on aging and hence does not allow removal of the label when desired.

The presence of a certain amount of alkali is required in the adhesive system to perform a variety of functions including acting as solvent for the resin, as neutralizer for the acidity of the starch and other materials, as an agent to impart certain desirable rheological and physical properties as well as to provide the optimum balance of ice-proofness and label removability to the system. This amount of alkali may be considered the amount required to ensure a pH between 8.0 and 11.0 in the final adhesive system. Values outside these pH limits tend to detract from the stability of the product and to affect the ice-proof and label removal properties. In accordance with the present invention, it has been found that only a certain percentage of the total alkali necessary for the stated pH range must be present as fixed alkali to form a salt with the styrene-maleic anhydride resin in order to provide the required degree of ice-proofness and label removability. Thus, it has been found that the addition of fixed alkali in an amount of at least 20% of the total alkali on a stoichiometric basis is sufficient to produce the desired adhesive composition. The remaining alkali can be non-fixed, e.g. ammonia, morpholine, etc. However, if some of the alkali employed is of a volatile or non-fixed nature, it will be necessary to add additional alkali to maintain the desired pH and compensate for the losses due to volatility.

In general, the adhesives of the present invention are made by dissolving with heat the sytrene-maleic anhydride resin in water made alkaline with the particular alkali component. A peptizer is then mixed in, followed by the addition of starch after which the mixture is cooked until smooth. After cooling, the mixture is adjusted with water to the desired viscosity. Defoamers, preservatives, coloring agents and other modifying agents may be added without affecting the spirit or essence of the invention.

DESCRIPTION OF THE PREFERRED EMBODIMENTS

As a base for the adhesives of the present invention, either raw starches or converted or modified starches may be employed. Thus, starches derived from any plant source including corn, potato, sweet potato, wheat, rice, sago, tapioca, waxy maize, sorghum, high amylose corn, etc. may be employed as may the corresponding conversion products as those dextrins prepared by the hydrolytic motion of acid and/or heat, the oxidized starches prepared by treatment with oxidants such as sodium hypochlorite, fluidity or thin boiling starches prepared by enzyme conversion or by mild acid hydrolysis or the corresponding ester or ether starch derivatives. The starches may be used singly or in combination to achieve various final properties in the adhesive composition. The preferred starches are amioca based since these starches, when cooked, have a higher resistance toward pasting up on aging. Raw corn starch or other starch derivatives may additionally be blended into the mixture for the desired rheological or machining properties.

The term "styrene-maleic anhydride resin" as used herein is also meant to include the corresponding acid functionalities as well as the preformed salts of the resins. In general, the styrene-maleic anhydride copolymers will vary in molar ratio of styrene to maleic anhydride from 1:1 to 3:1. They may vary in molecular weight from 1,600 to 50,000 and may include the respective half ester modifications with alcohols.

The styrene and maleic anhydride can be polymerized to form resins for use in this invention by any conventional polymerization methods. Solution polymerization methods can be employed where the monomers are polymerized in a suitable solvent using as a polymerization catalyst a free-radical catalyst, such as benzoyl peroxide or dicumyl peroxide, at a temperature of about 75° to 300°C (167° to 572°F) or more. Suitable solvents include the aromatic hydrocarbons such as cumene, p-cymene, xylene, toluene and the like. Typical preparation procedures are described in U.S. Pats. 3,085,994; 3,418,292 and 3,178,395.

The partial esters of these styrene-maleic anhydride resins can be prepared for use in this invention in conventional manners from alkanols of about 3 to 20 carbon atoms, preferably from hexanol or octanol. The extent of the half-esterification of the styrene-maleic anhydride copolymer will generally be about 10 to 100%, preferably 20 to 80%. That is, about 5 to 50%, preferably 20 to 40% of the total number of carboxyl groups of the copolymer are esterified with alcohol. The esterification can be effected by simply heating a mixture of the appropriate quantities of sytrene-maleic anhydride copolymer with the alcohol at elevated temperatures, usually about 100° to 200°C (212° to 392°F). Preparations of these esters are described in U.S. Pats. 3,342,787 and 3,392,155.

Among the preferred resins employed in this invention are the styrene-maleic anhydride copolymers having a styrene to maleic anhydride ratio of 3:1 and a molecular weight of 1900 and sold under the same SMA 3000A by Arco. A half ester, sold by Arco as SMA 2625A, having a styrene to maleic anhydride ratio of about 2:1, a molecular weight of 1900 and comprising a 50% hexyl half ester modification is also preferred. Another preferred resin has a styrene to maleic anhydride ratio of 1:1, a molecular weight of 50,000 and is available from Monsanto under the tradename Lytron 810.

The ratio of the styrene maleic anhydride to starch will generally vary between 4.8 and 20.0 parts styrene maleic anhydride per 100 parts starch, although larger amounts of starch may be employed for machining or rheological purposes.

Peptizers, such as urea, formamide, ammonium thiocyanate, acetamide, thiourea and dicyandiamide or mixtures thereof are required to prevent instability or pasting up of the finished products on aging. The amount of peptizer employed will in general vary in a ratio of peptizer to starch of from about 2.0:10.0 to 6.0:10.0, preferably from 3.0:10.0 to 5.0:10.0 depending upon a number of factors, particularly the type of starch base used. Thus, starches containing larger amounts of linear amylose as compared to the branched amylopectin units will require larger quantities of peptizer.

The required fixed alkali as previously discussed, includes any alkali which does not volatilize off during drying and therefore does not cause the styrene maleic anhydride salt to revert to an insoluble form on aging. Suitable fixed alkali include sodium potassium, lithium hydroxides and the organic amines such as the mono-, di- or tri-ethanolamines or the isopropanolamines. While these components may be used alone in amounts sufficient to obtain the desired pH levels, other alkali components which are not fixed may be employed in amounts up to 80% of the total alkali. This latter group of alkalis include such volatile materials as ammonia, morpholine, etc.

In order to eliminate variations which may occur due to volatility or relative basicity, it is to be understood that the requirement that at least 20% of the alkali be present as fixed alkali is meant 20% of the stoichiometric equivalent based on a 100% fixed alkali product.

Defoamers, preservatives, color agents and other modifying agents may be added without affecting the desirable properties of the adhesives of the invention. Thus, modifying agents such as wheat flour, bentonite, etc. may be employed for additional shortness and for machining requirements. Defoamers including tributyl phosphate, preservatives such as phenol, color agents like carmel and plasticizers and hygroscopic agents such as glycols, glycerine, fatty acids, etc. may also be employed as required.

Water is the aqueous solvent preferably employed for forming the liquid adhesive, however other aqueous media may be employed to dissolve the various ingredients, including for example, mixtures of organic solvents and water. The amount of solvent employed in preparing these compositions will vary depending upon the properties such as viscosity, etc. desired in the final product and may easily be determined by the practitioner.

The particular manner of addition of the ingredients in preparing the composition is not critical even in the case where a plurality of alkali components are employed. In the latter instance, the fixed alkali may be added first or, if post added, as to an ammonia product, will act to replace the volatile ammonia in the styrene-maleic anhydride salt.

The viscosity of the final product varies with the type of starch, the type of label, the labeling machine, its speed and the environmental conditions. Thus, viscosities can range from 10,000 cps. to 150,000 cps. at 72°F (22°C), however they will generally be within the range of 20,000 cps. and 60,000 cps.

A particularly preferred composition prepared in accordance with the present invention and containing only fixed alkali comprises a mixture of 50 parts water, 35 parts starch, 2.5 parts of a styrene maleic anhydride resin having a styrene to maleic anhydride ratio of 1:1 and a molecular weight of 50,000, 10 parts urea and 3.8 parts 25% sodium hydroxide. Another preferred composition in which some volatile alkali is present comprises a mixture of 65 parts water, 40 parts starch, 5 parts of a styrene maleic anhydride resin having a styrene to maleic anhydride ratio of 3:1 and a molecular weight of 1900, 10 parts urea, 5 parts concentrated ammonia and 2 parts 25% sodium hydroxide.

In the examples which follow and in evaluating the products produced in accordance with the present invention, the following tests were employed to evaluate the degree of ice-proofness and the removability of the labels.

"Ice-Proof" Test — The general ice-proof laboratory test used to evaluate cold water resistance consists of applying a 1 mil wet coating one-half inch wide) to each end of a beer label and quickly pressing the label to a clean, standard 12 oz. beer bottle. Sets of six bottles are then permitted to dry 24 hours at room temperature and then immersed in 40°F. (4°C) water maintained inside a refrigerator. They are observed each 24 hours for a total of 72 hours and a record kept of the label condition, i.e. on, off, edges flagging, etc. Another set of six bottles are allowed to dry 72 hours before testing. Ice-proofness for 72 hours after a 24 hour drying period is usually considered optimum. The test is considered "pass" if none of the labels of set of six falls off. It is considered "marginal" if one out of six labels falls off, and anything else is "fail".

"Label Removal" Test — The general label removal or "stripper" test consists of predrying labeled bottles for one month before immersion in a 150°F. (65°C.) bath composed of 5% NaOH and 0.1% wetting agent for two hours in order to simulate commercial bottle washing operations. A smaller mixer keeps the liquid swirling during the period and observations made of the label condition, i.e. time on, time off, etc. Sets of six are run this way. Fast removal, e.g. one-half hour, is considered preferable but removal within the two hour period is usually considered sufficient. Commercial strippers which remove labels more efficiently usually run on 20 minute cycles. The test is considered pass if all of the set of six labels come off. It is considered marginal if one out of the six stays on; all else is fail.

EXAMPLE I

This example shows that ammonia-styrene-maleic anhydride films tend to age into water resistance as the ammonia volatilizes off while the films prepared from both the corresponding sodium salt and the salt containing only 25% sodium remain soluble in water.

Three identical mixes of 20 parts Lytron 810 plus 80 parts of water were prepared. Then 30 parts of 25% sodium hydroxide were added to one, 11.3 parts concentrated ammonia to another and a mixture of 7.5 parts 25% sodium hydroxide and 8.5 parts concentrated ammonia to the third. All samples were mixed and heated at 180°F. (82°C.) for one hour when clear solutions formed. When cooled, two sets of three mil wet films of each type were coated on glass plates and air dried for two hours.

One set of each was then immersed in water and observed. All the samples disintegrated and dissolved in the water within two hours.

The second set of samples was aged for 1 week at room temperature and then immersed in the water. The sodium film as well as the ammonia film containing 25% sodium hydroxide dissolved, however, the pure ammonia film was still tough and tenacious. IR analysis confirmed the elimination of the ammonia and reversal to free acid in the latter film and also confirmed the stability of the sodium film.

EXAMPLE II

This example illustrates the preparation of the novel adhesives of the present invention as well as providing a comparison between the sodium and ammonia based adhesives with respect to ice-proofness.

2.5 parts Lytron 810 (Monsanto product with styrene to maleic anhydride ratio of 1:1 and molecular weight of 50,000) were mixed with 50 parts water and 3.8 parts 25% NaOH added thereto after which the blend was mixed for 30 minutes at 190°F. (88°C.). Then, 15 parts urea and 32.5 parts amioca starch were added to the blend and the temperature readjusted to 190°F. and mixing continued for two hours. After cooling, the final viscosity was adjusted with water to 20,000 cps at 72°F. (22°C.). The final pH was 9.5.

A second adhesive formulation was prepared using concentrated $NH_3$ in place of the NaOH. In this formulation it was necessary to use 2.6 parts concentrated $NH_3$ to obtain the pH of 9.5.

As a control, a sample was prepared without the styrene-maleic anhydride resin. In this case, the Lytron was replaced with additional starch and sufficient NaOH was added to give a pH of 9.5.

When bottles bearing labels which had been applied using samples of each of the adhesive formulations were subjected to the Ice-Proof Test, the labels from the control adhesive containing no resin fell off within four to six hours while the labels applied using the adhesives containing the sodium or ammonium salts of the styrene-maleic anhydride resins remained on throughout the duration of the 72 hour test.

It is thus seen that the sodium salt product exhibits the same ice-proofness as the ammonium salt product, a factor which may be considered unexpected in view of the solubility of the pure sodium sytrene-maleic anhydride salt film prepared in Example I.

EXAMPLE III

Bottles were labeled using adhesives prepared in accordance with method of Example II and using both the sodium and the ammonium salts of the styrene-maleic anhydride resins. The bottles were aged for one month and subjected to the Label Removal test previously described. The labels applied using the sodium based adhesives were removed within the two hour period while those applied using the corresponding ammonium salts were still on the bottles.

This example thus shows that although the sodium and ammonium salts of the styrene-maleic anhydride resins exhibit similar ice-proof properties when employed in a starch based adhesive, the label removed properties of the sodium salt product are far superior to those of the ammonium salt product.

EXAMPLE IV

The procedure of Example II was repeated using formamide in place of urea as a peptizer. The resulting adhesive exhibited similar ice-proof and label removal properties.

EXAMPLE V

Example II was repeated using stoichiometric equivalents of KOH, LiOH and diethanolamine in place of the NaOH. Testing for label removability and ice-proofness gave similar superior results.

EXAMPLE VI

Separate samples of the sodium salt product of Example II were modified by replacing 25%, 50%, 75% and 85% of the 25% NaOH with equivalents of concentrated NH$_3$ sufficient for pH of 9.5 in the final product. When subjected to the label removal test, only the 85% replacement did not pass while the 75% replacement passed. This indicates that about 20% of the total necessary alkali need be present in the form of fixed alkali in order to impart the desired label removal feature to the adhesive.

A variation of the above was made by adding to separate samples of the ammonium salt product of Example II, 15%, 25%, 50% and 75% additions of the 25% NaOH used in the sodium salt product. The addition of this fixed alkali will tend to volatilize off its equivalent ammonia and thereby maintain the desired total alkalinity. When the Label Removal test was performed on these samples, only the 15% addition did not pass while 25% did pass, again indicating that above 20% of the total alkali must be present as fixed alkali.

EXAMPLE VII

This example illustrates the wide range of styrene-maleic anhydride resins which may be employed in the present invention. Modifications of Example II are shown with Arco's SMA 3000A, a typical resin with styrene to maleic anhydride ratio of 3:1 and molecular weight of 1900. The procedure was also repeated with Arco SMA 2625, a typical half ester with styrene to maleic anhydride ratio of 2:1 and molecular weight of 1900. Both of these were used to replace Monsanto's Lytron 810, a resin with styrene to maleic anhydride ratio of 1:1 and molecular weight of 50,000 in the proportions which follow.

| Material | Parts | Parts |
| --- | --- | --- |
| amioca starch | 30 | 30 |
| raw corn starch | 10 | — |
| wheat flour | — | 5 |
| SMA 2625A | 5 | — |
| SMA 3000A | — | 5 |
| Urea | 10 | 10 |
| 25% NaOH | 3 | 2 |
| Conc. NH$_3$ | — | 2 |
| Water | 50 | 60 |

When subjected to Ice-Proof and Label Removal tests, the adhesives formed from both formulations passed both tests.

EXAMPLE VIII

Example II was repeated with the Lytron 810 varying in 0.5 increments from 0 to 7.5 parts. The 25% caustic was adjusted to give a final pH of 9.5. These modifications were then tested for ice-proofness label and removability with the following results.

| Parts Lyton 810 | Ice-proofness 24 Hour aging | Ice-proofness 72 Hour aging | Removability |
| --- | --- | --- | --- |
| 0–1 | Fail | Fail | Pass |
| 1.5–2.0 | Marginal | Pass | Pass |
| 2.5–5.0 | Pass | Pass | Pass |
| 5.5–6.5 | Pass | Pass | Marginal |
| 7.0–7.5 | Pass | Pass | Fail |

As is seen from the above results, only compositions containing Lytron 810 in amounts of 1.5 to 6.5 parts seem acceptable from both an ice-proof and label removal viewpoint.

EXAMPLE IX

The procedure of Example II was repeated varying the starch component as indicated. They were then tested for ice-proofness and label removability with the following results:

| Starch Composition | Parts | Ice-proofness | Removability |
| --- | --- | --- | --- |
| Tapioca | 32.5 | Pass | Pass |
| Potato | 32.5 | " | " |
| Corn | 32.5 | " | " |
| Mixture of amioca and corn | 27.5 / 5.0 | " | " |
| Mixture of amioca and tapioca | 27.5 / 5.0 | " | " |
| Mixture of amioca and potato | 27.5 / 5.0 | " | " |

We claim:

1. A cold water resistant adhesive composition comprising a mixture of starch, at least one styrene maleic anhydride copolymer having a styrene to maleic anhydride ratio of 1:1 to 3:1, a peptizer, water and sufficient alkali to give a pH within the range of 8.0 to 11.0 with at least 20% of the total alkali, on a stoichiometric equivalent basis, of a 100% fixed alkali product, employed in the form of a fixed alkali, said composition containing 4.8 to 20.0 parts sytrene maleic anhydride per 100 parts starch.

2. The cold water resistant adhesive composition of claim 1 wherein the fixed alkali is chosen from the group consisting of sodium, potassium, and lithium hydroxides, monoethanolamine, diethanolamine and triethanolamine.

3. The cold water resistant adhesive composition of claim 1 wherein the peptizer is present in a peptizer to starch ratio of 2:10 to 6:10.

4. The cold water resistant adhesive composition of claim 1 wherein the starch employed is amioca.

5. The cold water resistant adhesive of claim 1 comprising a mixture of 65 parts water, 40 parts starch, 5 parts styrene maleic anhydride resin having a sytrene to maleic anhydride ratio of 3:1 and a molecular weight of 1900, 10 parts urea, 5 parts concentrated ammonia and 2 parts 25% sodium hydroxide.

6. The cold water resistant adhesive of claim 1 wherein all the alkali is present in the form of fixed alkali.

7. The cold water resistant adhesive of claim 6 comprising a mixture of 50 parts water, 35 parts starch, 2.5 parts styrene maleic anhydride resin having a styrene to maleic anhydride ratio of 1:1 and a molecular weight of 50,000 10 parts urea and 3.8 parts 25% sodium hydroxide.

8. The cold water resistant adhesive of claim 1 wherein the styrene maleic anhydride copolymer is a 50% hexyl half ester modification having a styrene to maleic anhydride ratio of 2:1 and a molecular weight of 1900.

* * * * *